United States Patent
Zhu et al.

(10) Patent No.: US 9,428,678 B2
(45) Date of Patent: Aug. 30, 2016

(54) FAST CURING ADHESIVE USEFUL FOR BONDING TO GLASS

(71) Applicant: DOW GLOBAL TECHNOLOGIES LLC, Midland, MI (US)

(72) Inventors: Huide D. Zhu, Rochester, MI (US); Daniel P. Sophiea, Lake Orion, MI (US); Matthew B. Feldpausch, Waterford, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 14/435,311

(22) PCT Filed: Mar. 4, 2013

(86) PCT No.: PCT/US2013/028837

§ 371 (c)(1),
(2) Date: Apr. 13, 2015

(87) PCT Pub. No.: WO2014/098935

PCT Pub. Date: Jun. 26, 2014

(65) Prior Publication Data

US 2015/0232723 A1 Aug. 20, 2015

Related U.S. Application Data

(60) Provisional application No. 61/740,607, filed on Dec. 21, 2012.

(51) Int. Cl.
*C09J 175/08* (2006.01)
*B32B 37/12* (2006.01)
(Continued)

(52) U.S. Cl.
CPC .............. *C09J 175/08* (2013.01); *B32B 37/12* (2013.01); *C08K 3/04* (2013.01); *C08K 3/26* (2013.01);
(Continued)

(58) Field of Classification Search
CPC .............................. C09J 175/08; B32B 37/12
USPC ........................................................ 156/331.4
See application file for complete search history.

(56) References Cited

U.S. PATENT DOCUMENTS 4,345,053 A 8/1982 Rizk et al.
4,374,237 A 2/1983 Berger et al.
(Continued)

FOREIGN PATENT DOCUMENTS

EP 1524282 A1 4/2005

OTHER PUBLICATIONS

International Preliminary Report on Patentability dated Jul. 2, 2015, for Application No. PCT/US2013/028837.
(Continued)

*Primary Examiner* — Daniel Lee
(74) *Attorney, Agent, or Firm* — The Dobrusin Law Firm, P.C.

(57) ABSTRACT

A composition comprising: a one part adhesive composition comprising a) one or more isocyanate functional components; b) one or more catalysts for the reaction of isocyanate groups with active hydrogen containing groups; c) one or more fillers which do not enhance the formation of voids during curing; d) one or more fillers having basic character; and a cure accelerator comprising: e) one or more liquid carriers; f) water; and g) one or more paste forming agents. The one part adhesive composition may be used alone where ambient temperature and humidities afford reasonably rapid cure rates. The cure accelerator may be used when temperatures and/or humidities are sufficiently low such that the cure rate of the adhesive alone is not acceptable for a particular use.

15 Claims, 1 Drawing Sheet

(51) Int. Cl.
  *C08K 3/04* (2006.01)
  *C08K 3/34* (2006.01)
  *C08K 3/26* (2006.01)
  *C09D 175/08* (2006.01)

(52) U.S. Cl.
  CPC ............... *C08K 3/34* (2013.01); *C09D 175/08* (2013.01); *B32B 2037/1253* (2013.01); *B32B 2307/412* (2013.01); *B32B 2311/00* (2013.01); *B32B 2379/00* (2013.01); *C08K 2003/045* (2013.01); *C08K 2003/265* (2013.01)

(56) References Cited

U.S. PATENT DOCUMENTS

| | | |
|---|---|---|
| 4,538,920 A | 9/1985 | Drake |
| 4,625,012 A | 11/1986 | Rizk et al. |
| 4,687,533 A | 8/1987 | Rizk et al. |
| 4,780,520 A | 10/1988 | Rizk et al. |
| 5,063,269 A | 11/1991 | Hung |
| 5,082,147 A | 1/1992 | Jacobs |
| 5,603,798 A | 2/1997 | Bhat |
| 5,623,044 A | 4/1997 | Chiao |
| 5,852,103 A | 12/1998 | Bhat |
| 5,852,137 A | 12/1998 | Hsieh et al. |
| 5,922,809 A | 7/1999 | Bhat et al. |
| 5,976,305 A | 11/1999 | Bhat et al. |
| 6,015,475 A | 1/2000 | Hsieh et al. |
| 6,133,398 A | 10/2000 | Bhat et al. |
| 6,362,300 B1 | 3/2002 | Araki et al. |
| 6,512,033 B1 | 1/2003 | Wu |
| 6,709,539 B2 | 3/2004 | Zhou |
| 7,101,950 B2 | 9/2006 | Zhou et al. |
| 7,361,292 B2 | 4/2008 | Zhou |
| 7,416,599 B2 | 8/2008 | Hsieh et al. |
| 2006/0270807 A1* | 11/2006 | Zhu .................. C08G 18/12 525/453 |
| 2009/0114336 A1 | 5/2009 | Zhu et al. |

OTHER PUBLICATIONS

U.S. Appl. No. 13/455,294, filed Nov. 8, 2012, Jialenella et al.
PCT and Search Report for International Application No. PCT/US2013/028837 dated Dec. 20, 2013.

* cited by examiner

FAST CURING ADHESIVE USEFUL FOR BONDING TO GLASS

FIELD OF THE INVENTION

The invention relates to a fast curing system for bonding two substrates together comprising one or more isocyanate functional components. The invention also comprises a method of using such systems for bonding substrates together.

BACKGROUND OF THE INVENTION

Compositions having isocyanate functional components are utilized to bond substrates together, such as, glass, often in the form of windows, into structures. In automotive assembly plants windows are often bonded in with one part adhesive compositions containing isocyanate functional components, which cure by reaction with ambient moisture, and take several hours or days to cure. In the assembly plants, vehicles are not driven for several hours and this is acceptable. One part moisture curing adhesives known in the art are disclosed in U.S. Pat. Nos. 4,374,237; 4,687,533; 4,780,520; 5,063,269; 5,623,044; 5,603,798; 5,852,137; 5,922,809; 5,976,305; 5,852,137 and 6,512,033, relevant portions incorporated herein by reference.

Two-part compositions containing isocyanate functional prepolymers in one part and compounds having isocyanate reactive components in the other part are used where cure speed is important, such as in the automotive aftermarket replacement glass business. Customers desire that the adhesives cure quickly so that the vehicle can be driven as soon as possible after replacing the window. Examples of two-part compositions are disclosed in EP 1,524,282, U.S. Pat. Nos. 5,852,103; 6,709,539; 7,101,950 and 7,361,292, incorporated herein by reference in its entirety. For certain applications even two part compositions containing isocyanate functional prepolymers do not cure fast enough for certain applications or customers. One solution previously utilized commercially involved contacting an isocyanate functional prepolymer with a paste containing water, see Hsieh et al U.S. Pat. No. 4,687,533 incorporated herein by reference in its entirety. For Original Equipment Manufacturing, the use of two part systems has been replaced with one part systems containing catalysts that facilitate fast curing, see for example Risk et al. U.S. Pat. No. 4,780,520, incorporated herein by reference in its entirety. Some skilled artisans have attempted to address this problem by increasing catalyst concentrations or other formulation adjustments, many of these formulation adjustments result it formation of bubbles in the adhesive. Bubbles in the cured adhesive can result in dramatic reduction in the strength of the cured adhesives. These adhesives can be used in applications that are safety related and such reductions in strength are unacceptable.

The cure rate of adhesive systems with fast curing catalysts can be slower than desired when temperatures are significantly below ambient temperatures (about 23° C.) and/or ambient relative humidity's are low (less than 50 percent RH). There is a need for even faster curing systems when temperatures and/or relative humidity's are low. Thus, what are needed are adhesive systems which exhibit rapid cure rates at low ambient temperatures and humidity's and which do not form bubbles in the cured adhesives.

SUMMARY OF THE INVENTION

The invention is a composition comprising: a one part adhesive composition com-prising a) one or more isocyanate functional components; b) one or more catalysts for the reaction of isocyanate groups with active hydrogen containing groups; c) one or more fillers which do not enhance the formation of voids during curing; d) one or more fillers having basic character; and a cure accelerator comprising: e) one or more liquid carriers; f) water; and g) one or more paste forming agents. The one part adhesive composition may be used alone where ambient temperature and humidity's afford reasonably rapid cure rates. The cure accelerator may be used when temperatures and/or humidity's are sufficiently low such that the cure rate of the adhesive alone is not acceptable for a particular use. Preferably the one or more fillers which do not enhance the formation of voids during curing are selected from high surface area carbon blacks. In some embodiments, the paste forming agent comprises one or more materials that form a homogeneous paste with water and the liquid carrier. In some embodiments the liquid carrier is glycol ether or a polyether polyol. In some embodiments, the equivalent ratio of hydroxyl groups contained in the cure accelerator to isocyanate groups in the adhesive is from about 0.7:1.0 to 1.3:1.0. Preferably the one or more fillers having basic character exhibit a pH of 9.0 or greater when dissolved or dispersed in deionized water. Preferably the one or more fillers having basic character comprise one or more of talc or calcium carbonate.

In another embodiment, the invention is a method comprising: i) contacting the adhesive with the cure accelerator; ii) contacting the contacted parts with one or both of a first substrate and/or a second substrate; iii) contacting the first substrate and the second substrate with the contacted parts disposed between the two substrates; and iv) allowing the adhesive to cure and bond the two substrates together. Preferably, the adhesive and cure accelerator contacted in step i) are mixed prior to contacting with a substrate.

In one embodiment, the one part curable composition and the cure accelerator each have a viscosity at 25° C. such that the ratio of the viscosity of the one part curable composition to the cure accelerator is from about 0.1 to 10.0. In some embodiments the invention may be a method comprising: i) contacting the one part curable composition and the cure accelerator wherein the one part curable composition and the cure accelerator each have a viscosity at 25° C. such that the ratio of the viscosity of the one part curable composition to the cure accelerator is from about 0.1 to 10.0 and the volumetric ratio of the one part curable composition and the cure accelerator is about 25:1 to greater; ii) contacting the mixture with a first substrate; and iii) contacting the first substrate with a second substrate so that the mixed components are disposed therebetween on at least a portion of each of the substrates.

The compositions and methods of the invention allow substrates to be adhered together rapidly, especially at temperatures and/or relative humidity's below ambient. The cured compositions preferably exhibit lap shear strength at 4 hours from contacting the two parts at 10° C. and 30 percent relative humidity of about 100 psi or greater, more preferably about 150 psi or greater and most preferably 190 psi or greater. The compositions are useful as adhesives to bond substrates together and may be used to bond similar and dissimilar substrates together, for instance, plastics, glass, wood, ceramics, metal, coated substrates and the like. The compositions are especially useful for bonding glass to other substrates, such as vehicles and buildings and parts of modular components together, such as vehicle modular components. The glass can be bonded to coated and uncoated portions of vehicles. In one embodiment the composition bonds well to unprimed coated metals. Preferably the compositions exhibit an open time of about 10 to 15 minutes or more and more preferably about 15 to 20 minutes or more. The compositions are especially useful for bonding glasses into vehicle structures.

DETAILED DESCRIPTION

Figure 1:
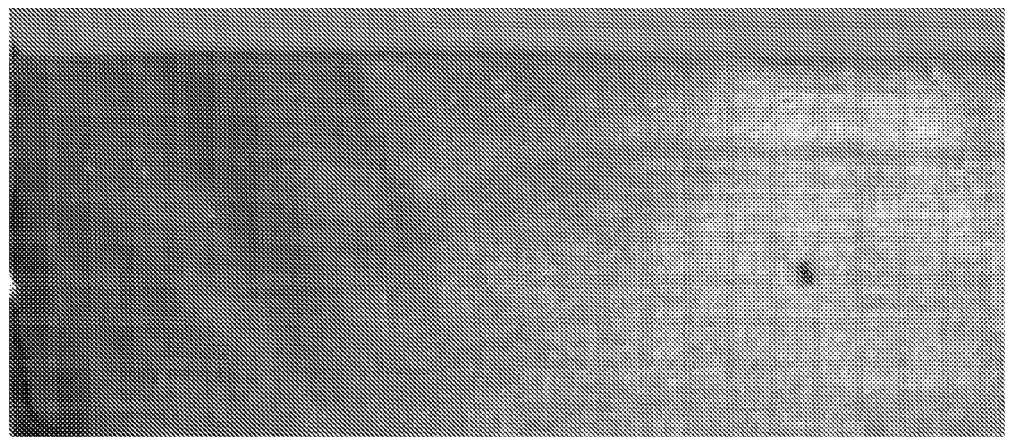
FIG. 1 is a picture of a cut through a cured composition of the invention.

One or more as used herein means that at least one, or more than one, of the recited components may be used as disclosed. Durability in this context means that the composition once cured remains sufficiently strong to perform its designed function, in the embodiment wherein the cured composition is an adhesive, the adhesive holds substrates together for the life or most of the life of the structure containing the cured composition. As an indicator of this durability, the curable composition (e.g. adhesive) preferably exhibits excellent results during accelerated aging. Preferably this means that after a set of substrates bonded with the composition of the invention is exposed to heat aging, the failure mode in Quick Knife adhesion or Lap Shear testing is cohesive, meaning the adhesive breaks before the bond of the adhesive to the substrate breaks. Isocyanate content means the weight percent of isocyanate groups in the designated component, which can be measured by analytical techniques known to one skilled in the art, for example by potentiometric titration with an active hydrogen containing compound, such as dibutyl amine. Hydrocarbyl refers to a group containing one or more carbon atom backbones and hydrogen atoms, which may optionally contain one or more heteroatoms. Where the hydrocarbyl group contains heteroatoms, the heteroatoms may form one or more functional groups well known to one skilled in the art. The term isocyanate-reactive compound as used herein includes any organic compound having nominally at least two isocyanate-reactive groups. For the purposes of this invention, isocyanate-reactive groups, active hydrogen containing groups, refer to a group containing a hydrogen atom which, because of its position in the molecule, displays significant activity according to the Zerewitinoff test described by Wohler in the *Journal of the American Chemical Society*, Vol. 49, p. 3181 (1927). Illustrative of isocyanate-reactive groups are —COOH, —OH, —NH$_2$, —NH—, —CONH$_2$, —SH, and —CONH—. Preferable compounds containing isocyanate-reactive groups include polyols, polyamines, polymercaptans and polyacids.

The invention comprises a one part adhesive composition containing an isocyanate functional component as the reactive component adapted to be used with a cure accelerator. The invention further comprises a cure accelerator useful for accelerating the cure of a one part adhesive containing an isocyanate functional component as the reactive component. The invent-tion further comprises the one part adhesive composition and the cure accelerator. The adhesive and cure accelerator are mixed in volumetric ratios such that the equivalent ratios as discussed herein are achieved. Preferably the volumetric ratios of adhesive to cure accelerator are about 25:1 or greater and most preferably about 30:1 or greater. Preferably the volumetric ratios adhesive to cure accelerator are about 200:1 or less, more preferably about 100:1 or less and most preferably about 50:1 or less.

Isocyanate based (polyurethane or polyurea forming) curable systems comprise an isocyanate functional component. An isocyanate functional component contains one or more compounds having on average more than one isocyanate group per molecule. The isocyanate functional components can be any component which contains on average more than one isocyanate group (moiety). The isocyanate functional component can be in the form of an iso-cyanate functional prepolymer, a monomer or oligomer or an adduct of one or more monomer or oligomers having isocyanate groups and a compound containing on average greater than 1 isocyanate reactive groups, and preferably 2 or more isocyanate groups. The isocyanate prepolymer can be any prepolymer prepared by reaction of an isocyanate functional compound with one or more compounds having on average more than one isocyanate functional groups.

The one or more isocyanate functional components, preferably prepolymers, are pre-sent in sufficient quantity to provide cohesive strength, and in adhesive uses, adhesive character to the composition. Such isocyanate functional components, such as prepolymers, have an aver-age isocyanate functionality sufficient to allow the preparation of a crosslinked polyurethane upon cure and not so high that the polymers are unstable. Prepolymers useful as isocyanate functional components are prepared by reacting one or more polyisocyanates with one or more compounds containing on average more than one isocyanate reactive group per molecule. The isocyanate functional components, prepolymers, preferably have a free isocyanate content which facilitates acceptable strength in the compositions prepared therefrom, as described hereinbefore. The isocyanate content in the isocyanate functional components is preferably about 0.4 percent by weight or greater based on the weight of the isocyanate functional components, more preferably about 0.7 percent by weight or greater, even more preferably about 1.0 percent or greater, even more preferably about 8 percent by weight or greater and most preferably about 1.2 percent by weight or greater. The isocyanate content in the isocyanate functional components is preferably about 15 percent by weight or less based on the weight of the isocyanate functional components, more preferably about 10 percent by weight or less, even more preferably about 5.0 percent by weight or les and most preferably about 3.0 percent by weight or less.

Preferably, the polyisocyanates for use in preparing the isocyanate functional com-ponents of the invention include any aliphatic, cycloaliphatic, araliphatic, heterocyclic or aromat-ic polyisocyanate, or mixtures thereof. Preferably, the polyisocyanates used have an average iso-cyanate functionality of about 2.0 or greater and an equivalent weight of about 80 or greater. Preferably, the isocyanate functionality of the polyisocyanate is 2.2 or greater and is most preferably about 2.4 or greater; and is preferably about 4.0 or less, more preferably about 3.5 or less, and most preferably about 3.0 or less. Higher functionality may also be used, but may cause ex-cessive cross-linking, and result in a composition which is too viscous to handle and apply easily, and can cause the cured composition to be too brittle. Preferably, the equivalent weight of the polyisocyanate is about 110 or greater, and is most preferably about 120 or greater; and is prefer-ably about 300 or less, more preferably about 250 or less, and most preferably about 200 or less. Examples of preferable polyisocyanates include those disclosed by Wu, U.S. Pat. No. 6,512,033 at column 3, line 3 to line 49, incorporated herein by reference. More preferred isocyanates are aro-matic isocyanates, alicyclic isocyanates and derivatives thereof. Preferably, the aromatic isocyan-ates have the isocyanate groups bonded directly to aromatic rings. Even more preferred polyiso-cyanates include diphenylmethane diisocyanate and polymeric derivatives thereof, isophorone di-isocyanate, tetramethylxylene diisocyanate, 1,6-hexamethylene diiso-cyanate and polymeric derivatives thereof, bis(4-isocyanatocylohexyl)methane, and trimethyl hexamethylene diisocyan-ate. The most preferred isocyanate is diphenylmethane diisocyanate. The amount of isocyanate containing compound used to prepare the prepolymer is that amount that gives the desired proper-ties, that is, the appropriate free isocyanate content and viscosities as discussed herein. Preferably, the isocyanates are used to prepare in the prepolymer in an amount of about 1.3 equivalents of iso-cyanate (NCO) per equivalent of active hydrogen or greater, more preferably about 1.4 equivalents of isocyanate or greater and most preferably about 1.5 equivalents of isocyanate or greater. Preferably, the polyisocyanates used to prepare the prepolymer are used in an amount of about 3.0 equivalents of isocyanate per equivalent of active hydrogen or less, more preferably 2.5 equivalents of isocyanate or less and most preferably about 2.0 equivalents of isocyanate or less.

Preferably the isocyanate functional components are the reaction product of one or more polyisocyanates with one or more compounds having more than one, preferably two or more, isocyanate-reactive groups wherein an excess of isocyanate groups are present on an equi-valents basis. Preferably such isocyanate reactive groups are hydroxyl groups and amino groups. A preferred class of such compounds includes polyols, preferably a mixture of one or more poly-ether diols and/or one or more polyether triols. Preferably, polyols useful in the preparation of the prepolymers include those disclosed in Wu, U.S. Pat. No. 6,512,033 at column 4, line 10 to line 64, incorporated herein by reference, and include, for example, polyether polyols, polyester polyols, poly(alkylene carbonate)polyols, hydroxyl containing polythioethers and mixtures thereof. Preferred polyols are polyether polyols containing one or more alkylene oxide units in the backbone of the polyol. Preferred alkylene oxide units are ethylene oxide, propylene oxide, butylene oxide and mixtures thereof. The alkylene oxides can contain straight or branched chain alkylene units. Preferably, the polyol contains propylene oxide units, ethylene oxide units or a mixture thereof. In the embodiment where a mixture of alkylene oxide units is contained in a polyol, the different units can be randomly arranged or can be arranged in blocks of each of the alkylene oxides. In one preferred embodiment, the polyol comprises propylene oxide chains with ethylene oxide chains capping the polyol. Preferably the ethylene oxide capped polypropylene oxides are hydrophobic, and preferably contain less than about 20 mole percent of ethylene oxide and more preferably less than 10 mole percent of ethylene oxide in the backbone. In a preferred embodiment, the polyols are a mixture of diols and triols. Preferably, the isocyanate-reactive compound has a functionality of about 1.8 or greater, more preferably about 1.9 or greater, and is most preferably about 1.95 or greater; and is preferably about 4.0 or less, more preferably about 3.5 or less, and is most preferably about 3.0 or less. Preferably, the equivalent weight of the iso-cyanate-reactive compound is about 200 or greater, more preferably about 500 or greater, and is more preferably about 1,000 or greater; and is preferably about 5,000 or less, more preferably about 3,000 or less, and is most preferably about 2,500 or less. The isocyanate reactive compon-ents are present in an amount sufficient to react with most of the isocyanate groups of the isocyanates leaving enough isocyanate groups to correspond with the desired free isocyanate con-tent of the prepolymer. Preferably, the isocyanate reactive components are present in an amount of about 50 parts by weight or greater based on the weight of the isocyanate functional compon-ent, more preferably about 65 parts by weight or greater and most preferably about 80 parts by weight or greater. Preferably, the isocyanate components are present in an amount of about 95 parts by weight or less based on the of the isocyanate functional component and most preferably about 90 parts by weight or less.

The isocyanate functional component may contain alkoxy silane moieties. All of the isocyanate functional components used in the adhesive may contain alkoxysilane moieties or such isocyanate functional components may be blended with one or more isocyanate functional components which do not contain alkoxy silane moieties. The isocyanate functional components may contain sufficient alkoxy silane moieties to improve the adhesion to substrates, for instance glass and coated substrates. The alkoxy silane content in the isocyanate functional components is preferably about 0.1 percent by weight or greater, more preferably about 0.4 percent by weight or greater and most preferably about 0.8 percent by weight or greater. The alkoxy silane content in the isocyanate functional components is preferably about 3.0 percent by weight or less, more preferably about 2.0 percent by weight or less and most preferably about 1.0 percent by weight or less. "Alkoxy silane content" means the weight percentage of alkoxy silane moieties to the total weight of the prepolymer.

The isocyanate functional component may comprise one or more prepolymers con-taining one or more organic based polymer particles dispersed therein or grafted to the backbone. Preferably, the organic based polymer particles is included in the prepolymer by inclusion of a dispersion triol having dispersed therein or grafted to the backbone particles organic based polymer particles. The preferable polyols are disclosed in Zhou, U.S. Pat. No. 6,709,539 at column 4, line 13 to column 6, line 18, incorporated herein by reference. Preferably, the polyols comprise one or more polyether triols and more preferably one or more polyoxyalkylene based triols. Preferably, such polyoxyalkylene oxide triols comprise polyoxypropylene chains with polyoxy-ethylene end caps. In one embodiment, the prepolymer also comprises a polyol containing organic based polymer particles. Preferably, the particles dispersed in the dispersion triol com-prise one or more of thermoplastic polymers, rubber-modified thermoplastic polymers or a polyurea. Preferably such pre-polymers are contained in the adhesive in an amount of about 0.5 percent by weight or greater. Preferably such prepolymers are contained in the adhesive in an amount of about 5 percent by weight or less.

The one part composition useful as an adhesive may further comprise one or more isocyanate functional prepolymers containing one or more polyester based polyols which are solid at ambient temperature, about 23° C. The polyester based polyols have melting points such that the prepolymer provides sufficient green strength to prevent the substrates from moving in relation to one another due to gravitational forces at ambient temperatures. In terms of installing a window in a vehicle or building, the polyester based pre-polymer prevents the window from slid-ing after installation. Preferably, the polyester polyols have melting points of about 40° C. or greater, even more preferably about 45° C. or greater and most preferably about 50° C. or greater. Preferably, the polyester polyols exhibit melting points of about 85° C. or less, even more preferably about 70° C. or less and most preferably about 60° C. or less. The polyester based isocyanate prepolymer can be prepared using one or more polyester polyols and preferably an aromatic polyisocyanate. In order to facilitate pumpability, it may be diluted with a plasticizer. Preferably, the polyester polyol based isocyanate prepolymer is present in the composition in sufficient amount to enhance the needed green strength, rheology and pumpability of the composition. If the amount is too high, the composition is not hand gun applicable at ambient temperature. Preferably, the polyester polyol based isocyanate prepolymer is present in the composition in an amount of about 0 percent by weight or greater based on the weight of the composition, more preferably about 1 percent by weight or greater and most preferably about 2 percent by weight or greater. Preferably, the polyester polyol based isocyanate prepolymer is present in the composition in an amount of about 10 percent by weight or less, even more preferably about 5 percent by weight or less and most preferably about 3 percent by weight or less.

The isocyanate functional components may be prepared by any suitable method, such as bulk polymerization and solution polymerization. The reaction to prepare the isocyanate functional components is carried out under anhydrous conditions, preferably under an inert atmosphere such as a nitrogen blanket and to prevent crosslinking of the isocyanate groups by atmospheric moisture. The reaction is preferably carried out at a temperature between about 0° C. and about 150° C., more preferably between about 25° C. and about 90° C., until the residual isocyanate content determined by titration of a sample is very close to the desired theoretical value. The reactions to prepare the isocyanate functional components may be carried out in the presence of urethane catalysts, for example stannous salts of carboxylic acids, such as stannous octoate, stannous oleate, stannous acetate, and stannous laurate; dialkyltin dicarboxylates, such as dibutyltin dilaurate and dibutyltin diacetate; tertiary amines and tin mercaptides. The amount of catalyst employed is generally from about 0.005 to about 5 parts by weight of the mixture catalyzed. Preferably, the reaction is carried out in admixture with a plasticizer.

The isocyanate functional components are present in the composition in a sufficient amount such that the cured composition has sufficient strength for its designed purpose, such that the adhesive is capable of bonding substrates together and to provide the desired cohesive and adhesive strengths. Preferably, the isocyanate functional components are present in an amount of about 10 percent by weight or greater based on the weight of the composition, more preferably about 40 percent by weight or greater and most preferably about 45 percent by weight or greater. Preferably, the isocyanate functional components are present in an amount of about 70 percent by weight or less based on the weight of the composition, more preferably about 65 percent by weight or less and most preferably about 55 percent by weight or less.

The one part compositions useful as adhesives may further comprise one or more polyfunctional isocyanates for the purpose of improving adhesion of the composition to substrate surfaces. "Polyfunctional" as used in the context of the isocyanates refers to isocyanates having a functionality of 2 or greater. The polyisocyanates can be any monomeric, oligomeric or polymeric isocyanates having a nominal functionality of about 3 or greater, more preferably, about 3.2 or greater. Preferably, the polyfunctional isocyanates have a nominal functionality of about 5 or less, even more preferably about 4.5 or less and most preferably about 4.2 or less.

The polyfunctional isocyanates can be any isocyanates which are reactive with the isocyanate polyisocyanate prepolymers and/or isocyanate reactive components used in the composition and which improve the modulus of the cured composition. The polyisocyanates can be monomeric; trimeric isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, such as those available from Bayer under the trademark and designation DESMODUR N3300, DESMODUR N-100, and polymeric isocyanates such as polymeric MDI (methylene diphenyl diisocyanates) such as those marketed by The Dow Chemical Company under the trademark of PAPI, including PAPI 20 and PAPI 27 polymeric isocyanates. The polyfunctional isocyanates are present in a sufficient amount to impact the modulus of the cured compositions of the invention. If too much is used, the cure rate of the composition is unacceptably slowed down. If too little is used, the desired modulus levels may not be achieved. The polyfunctional isocyanate is preferably present in an amount of about 0.5 percent by weight or greater based on the weight of the composition, more preferably about 1.0 percent by weight or greater and most preferably about 1.4 percent by weight or greater. The polyfunctional isocyanate is preferably present in an amount of about 8 percent by weight or less, based on the weight of the composition, more preferably about 5 percent by weight or less and most preferably about 3 percent by weight or less.

The compositions may also contain one or more catalysts which catalyzes the reac-tion of isocyanate moieties with water or an active hydrogen containing compound. The catalysts can be any catalysts known to the skilled artisan for the reaction of isocyanate moieties with isocyanate reactive compounds, including tertiary amines, metal catalysts, for example organotin compounds and metal alkanoates. A mixture of a tertiary amine and a metal catalyst, such as an organotin compound is preferred. Exemplary organotin compounds include alkyl tin oxides, stan-nous alkanoates, dialkyl tin carboxylates and tin mercaptides. Stannous alkanoates include stan-nous octoate. Alkyl tin oxides include dialkyl tin oxides, such as dibutyl tin oxide and its deriva-tives. The organotin catalyst is preferably a dialkyltin dicarboxylate or a dialkyltin dimercaptide. Dialkyl tin dicarboxylates with lower total carbon atoms are preferred as they are more active catalysts. Preferred dialkyl dicarboxylates include 1,1-dimethyl-in dilaurate, 1,1-dibutyltin diacetate and 1,1-dimethyl dimal-eate. Preferred metal alkanoates include bismuth octoate or bismuth neodecanoate. The metal catalyst is present in an amount of about 60 parts per million or greater based on the weight of the composition, more preferably 120 parts by million or greater. The metal catalyst is present in an amount of about 1.0 percent or less based on the weight of the composition, more preferably 0.5 percent by weight or less and most preferably 0.3 percent by weight or less.

The tertiary amine catalysts may comprise one or more compounds having one of more tertiary amine groups capable of accelerating the reaction of isocyanate moieties with active hydrogen containing groups. Exemplary tertiary amine catalysts include dimorpholinodialkyl ether, a di((dialkylmorpholino)alkyl)ether, bis-(2-dimethylaminoethyl) ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine and mixtures thereof. A preferred dimorpholinodialkyl ether is dimorpholinodiethyl ether. A preferred di((dialkylmor-pholino)alkyl)ether is (di-(2-(3,5-dimethylmorpholino)ethyl)-ether). One class of tertiary amines comprise diazabicyclo compounds which are compounds which have diazabicyclo structures Among preferred diazabicyclo hydrocarbons include diazabicycloalkanes and diazabicyclo alkene salts. In some embodiments, it is preferable that the catalyst comprises one or more diazabicycloalkanes and one or more diazabicyclo alkene salts. Preferred diazabicycloalkanes include diazabicyclooctane, available from Air Products under the trademark and designations, DABCO, DABCO WT, DABCO DC 1, DABCO DC 2, and DABCO DC 21. Preferred diazabicycloalkene salts include diazabicyclo-undecene in the phenolate, ethylhexoate, oleate and formiate salt forms, available from Air Products under the trademark and designations, POLYCAT SA 1, POLYCAT SA 1/10, POLYCAT SA 102 and POLYCAT SA 610. The one or more compounds containing one or more tertiary amines are present in an amount of about 0.05 percent by weight or greater based on the weight of the composition, more preferably about 0.1 percent by weight or greater and most preferably about 0.15 percent by weight or greater. The one or more compounds containing one or more tertiary amine groups are present in an amount of about 5.0 percent by weight or less based on the weight of the composition, more preferably about 2.0 percent by weight or less and most preferably about 1.0 percent by weight or less.

The one part composition useful as an adhesive may further comprise an adhesion promoter or adhesion promoting component, such as those disclosed in Mandi, U.S. Patent Publication 2002/0100550 paragraphs 0055 to 0065 and Hsieh, U.S. Pat. No. 6,015,475 column 5, line 27 to column 6, line 41 incorporated herein by reference. Preferably the adhesion promoter contains a silane present in some form, such as disclosed in Wu et al., U.S. Patent 6,512,033 at column 5, line 38 to column 7, line 27; U.S. Pat. Nos. 5,623,044; 4,374,237; 4,345,053 and 4,625,012, relevant portions incorporated herein by reference. The silane may be blended with the isocyanate functional component. In some embodiments the silane has one or more active hydrogen atom which are reactive with an isocyanate. In some embodiments, the silanes having, active hydrogen atoms reactive with isocyanate moieties, can be reacted with the terminal isocyanate moieties of the prepolymer. Such reaction products are disclosed in U.S. Pat. No. 4,374,237 and 4,345,053 relevant parts incorporated herein by reference In other embodiments, silanes having reactive hydrogen moieties reactive with isocyanate moieties can be reacted into the backbone of the prepolymer by reacting such silane with the starting materials during the preparation of the prepolymer. The process for the preparation of prepolymers containing silane in the backbone is disclosed in U.S. Pat. No. 4,625,012, relevant portions incorporated herein by reference. Such silane, having active hydrogen moieties, can be reacted with a polyisocyanate to form an adduct which is blended with the prepolymer reacted with a polyurethane prepolymer or reacted with a polyisocyanate and a compound having on average more than one moiety reactive with an isocyanate moiety. Preferably the adduct is a reaction product of a secondary amino- or mercapto-alkoxy silane and a polyisocyanate, the adduct having an average of at least one silane group and at least one isocyanate group per molecule (hereinafter "adduct"). Exemplary polyisocyanates for use in preparing the adduct include those described above as suitable for use in preparing the prepolymer, particularly including isophorone diisocyanate, polymethylene polyphenyl-isocyanates, and aliphatic polyisocyanate such as hexamethylene diisocyanate. Exemplary organofunctional silanes useful as adhesion promoters or to prepare adducts include amino- or mercapto-alkoxy silanes, isocyanato alkoxy silanes, methacryloxy silanes, epoxy alkoxy silanes, alkenyl alkoxy silanes and the like. Examples of such compounds include: N,N-bis[(3-triethoxysilyl) propyl] amine; N,N-bis[(3-tripropoxy-silyl) propyl]amine; N-(3-trimethoxysilyl) propyl-3-[N-(3-trimethoxysilyl)-propylamino]propion-amide; N-(3-triethoxysilyl)propyl-3-[N-3-triethoxysilyl)-propyl-amino]propionamide; N-(3-trimethoxysilyl)propyl-3- [N-3-triethoxysilyl)-propylamino]propionamide; 3-trimethoxysilyl-propyl 3-[N-(3-trimethoxysilyl)-propylamino]-2-methyl propionate; 3-triethoxysilyl propyl 3-[N-(3-triethoxysilyl)-propylamino]-2-methyl pro-pionate; 3-trimethoxysilylpropyl 3-[N-(3-triethoxy- silyl)-propylamino]-2-methyl propionate; and the like. The amino-alkoxy silanes are not utilized to prepare alkoxy silane modified prepolymers or adducts but are not generally utilized as additives as they may react with the isocyanate groups of the prepolymers during storage. The amount of adhesion promoter present is that amount which enhances the adhesion of the adhesive to the substrate surface. The amount of adhesion promoter present is preferably about 0.1 percent by weight or greater based on the weight of the adhesive and most preferably about 0.5 percent by weight or greater. The amount of adhesion promoter used is preferably about 10 percent by weight or less and most preferably about 2.0 percent by weight or less.

The one part composition useful as an adhesive may further include one or more one or more fillers which do not enhance the formation of voids during curing. Reactions of isocyanates with active hydrogen containing compounds can generate carbon dioxide which can form voids in the curing and cured compositions. It has been discovered that certain fillers can impact the formation of such voids. Thus fillers that do not enhance or that reduce the formation of voids are desirable for use in the composition. Preferred fillers that do not enhance or reduce the formation of voids comprise one or more high surface area carbon blacks. In some embodiments, more than one filler may be used, of which one is carbon black in a sufficient amount to color to the composition black. Other fillers that increase the strength of the composition and provide thixotropic properties to the composition that may be present include titanium dioxide, surface treated silica, titanium oxide, and fumed silica. The fillers which do not enhance the formation of voids during curing are used in a sufficient amount to increase the strength of the composition and to provide thixotropic properties to the composition. Preferably, such fillers are present in an amount of about 1 percent by weight of the composition or greater, more preferably about 10 percent by weight or greater and most preferably about 15 percent by weight or greater. Preferably, the such fillers are present in an amount of about 35 percent by weight of the composition or less, more preferably about 30 percent by weight or less and most preferably about 25 percent by weight or less. High surface area is determined by the ASTM D1510 method. Preferred high surface area fillers exhibit an iodine adsorption number of about 100 g/kg or greater and most preferably about 130 g/kg or greater.

The one part composition useful as an adhesive comprises a filler having basic character. Basic character as used herein means that when the filler is dissolved or dispersed in deionized water it exhibits a pH of 8.0 or greater, more preferably 9.0 or greater and most preferably about 9.4 or greater. This is measured at a concentration of the basic filler in deionized water of about 25 percent by weight at a temperature of about 25° C. Any filler that exhibits basic character and positively impacts the properties of the adhesive, such as cure rate, may be utilized. Examples of fillers with basic character include untreated alkali metal or alkaline earth metal carbonates (for example calcium carbonate, sodium carbonate and potassium carbonate), talc and the like. The fillers with basic character are present in sufficient amount to positively affect adhesive properties and cure rate. Preferably the fillers with basic character are present in about 5 percent by weight or greater based on the weight of the one part curable composition, more preferably about 9 percent by weight or greater and most preferably about 15 percent by weight or greater. Preferably the fillers with basic character are present in about 50 percent by weight or less based on the weight of the one part curable composition, more preferably about 35 percent by weight or less and most preferably about 25 percent by weight or less.

The one part curable composition preferably contains one or more plasticizers to modify rheological properties to a desired consistency. Such materials should be free of water, inert to isocyanate groups and compatible with the prepolymer. Such material may be added to the reaction mixtures for preparing the isocyanate functional components, such as prepolymers, or to the mixture for preparing the final composition, but is preferably added to the reaction mixtures for preparing the isocyanate functional component, so that such mixtures may be more easily mixed and handled. Exemplary plasticizers are well known in the art and include straight and branched alkyl-phthalates, such as diisononyl phthalate, dioctyl phthalate and dibutyl phthalate, a partially hydrogenated terpene, trioctyl phosphate, epoxy plasticizers, toluene-sulfamide, chloro-paraffins, adipic acid esters, castor oil, xylene, 1-methyl-2-pyrrolidi-none and toluene. The amount of plasticizer used is that amount sufficient to give the desired rheological properties and disperse the components in the composition. Preferably, the plasticizer is present in the one part curable compositions in an amount of about 0.5 part by weight or greater based on the weight of the one part curable compositions, more preferably about 1.0 percent by weight or greater and most preferably about 5.0 percent by weight or greater. The plasticizer is preferably present in an amount of about 35 percent by weight or less based on the weight of the one part curable compositions and most preferably about 30 percent by weight or less.

Other components commonly used in one part curable compositions may be used. Such materials are well known to those skilled in the art and may include ultraviolet stabilizers and antioxidants and the like. The one part curable compositions may also contain durability sta-bilizers known in the art, such as alkyl substituted phenols, phosphites, sebacates and cinnamates, as disclosed in commonly owned patent application titled Dual Cure Adhesive Useful For Bond-ing To Glass, Jialanella U.S. patent application Ser. No. 13/455,294 filed Apr. 25, 2012, relevant parts incorporated herein by reference. Preferably, durability sta-bilizers are present in the composition in an amount of about 0.1 percent by weight or greater and more preferably about 0.2 percent by weight or greater based on the weight of the composition. Preferably durability stabilizers are present in the composition in an amount of about 1.0 percent by weight or less and more preferably about 0.5 percent by weight or less based on the weight of the composition. The one part curable compositions may further include a light stabilizer which facilitates the system maintaining durable bond to the substrate for a significant portion of the life of the structure to which it is bonded may be used. Preferred light stabilizers are hindered amine light stabilizers. Exemplary hindered amine light stabilizers are disclosed in Hsieh et al. U.S. Pat. No. 7,416,599 column 11, line 31 to line 63, incorporated herein by reference. A sufficient amount is used to enhance the bond durability to the substrate. Preferably, the light stabilizer is used in amount of about 0.1 percent by weight or greater based on the weight of the one part curable composition, more preferably about 0.2 percent by weight or greater and most preferably about 0.3 percent by weight or. Preferably, the light stabilizer is present in an amount of about 3 weight percent or less based on the weight of the one part curable composition, more preferably about 2 weight percent or less and most preferably about 1 weight percent or less. The one part curable composition may further comprise an ultra-violet light which enhances the durability of the bond of the composi-tion to a substrate. Preferred UV light absorbers include benzophenones and benzotriazoles. Exemplary UV light absorbers include those disclosed in Hsieh et al. U.S. Pat. No. 7,416,599 column 11, line 64 to Column 12 line 29, incorporated herein by reference. Preferably, the UV absorber is used in an amount of about 0.1 percent by weight or greater based on the weight of the one part curable composition, more preferably about 0.2 weight percent or greater and most preferably about 0.3 weight percent or greater. Preferably, the UV light inhibitor is used in amount of about 3 percent by weight or less based on the weight of the one part curable composition, more preferably about 2 percent by weight or less and most preferably about 1 percent by weight or less.

The cure accelerator is a paste containing water. A paste containing water is present to speed up the cure of the one part curable composition useful as an adhesive, especially at low temperature and/or low relative humidity. That is less than ambient 25° C. and/or 50 percent relative humidity and more preferably less than 15° C. and/or 35 percent relative humidity. The cure accelerator contains water, a liquid carrier and a paste forming agent. Preferably the cure accelerator is a homogeneous paste. The liquid carrier is any liquid that can form a stable paste with water and the paste forming agent and which does not negatively impact the properties of the one part curable composition with respect to application and its ultimate properties. Preferably the liquid carrier contains isocyanate reactive groups and participates in the cure of the isocyanate functional component. Preferably the liquid carrier facilitates formation of homogeneous paste. Preferably the liquid carrier comprises one or more glycol ethers, polyether polyols, polyamines and polyether amines. More preferably the liquid carrier one or more glycol ethers and polyether polyols, and most preferably one or more polyether polyols. Preferred polyether polyols are des-cribed herein with respect to isocyanate reactive compounds. The liquid carrier is present in sufficient amount to form a paste and preferably a homogeneous paste. Preferably the liquid carrier is present in an amount of about 40 weight percent or greater based on the weight of the cure accelerator, more preferably about 45 weight percent by weight or greater and most preferably about 50 weight percent or greater. Preferably the liquid carrier is present in an amount of about 70 weight percent or less based on the weight of the cure accelerator, more preferably about 65 weight percent by weight or less and most preferably about 62 weight percent or less. Preferably the liquid carrier is present in an amount of about 1 weight percent or greater based on the weight of the one part curable composition and the cure accelerator, more preferably about 2.0 weight percent by weight or greater and most preferably about 2.25 weight percent or greater. Preferably the liquid carrier is present in an amount of about 5 weight percent or less based on the weight of the one part curable composition and the cure accelerator, more preferably about 4 weight percent by weight or less and most preferably about 3.5 weight percent or less.

Water is present in sufficient amount, along with the liquid carrier, to provide a sufficient amount of isocyanate reactive groups to react with the isocyanate groups of the one part curable composition when the two parts are contacted so as to cure the composition at a reason-ably rapid rate. The equivalent ratio of isocyanate reactive groups in the cure accelerator to iso-cyanate groups in the one part curable composition is chosen so as to result in the desired cure rate. Preferably the equivalent ratio of isocyanate reactive groups in cure accelerator to isocyanate groups in the one part curable composition is about 0.3:1 or greater, more preferably about 0.5:1 or greater and most preferably 0.7:1 or greater. Preferably the equivalent ratio of isocyanate reactive groups in the cure accelerator to isocyanate groups in the one part curable composition is about 2:1 or less, more preferably about 1.5:1 or less and most preferably 1.3:1 or less. Preferably water is present in an amount of about 1.0 weight percent or greater based on the weight of the cure accelerator, more preferably about 2.0 weight percent by weight or greater and most prefer-ably about 4 weight percent or greater. Preferably water is present in an amount of about 20 weight percent or less based on the weight of cure accelerator, more preferably about 10 weight percent by weight or less and most preferably about 8 weight percent or less. Preferably water is present in an amount of about 0.01 weight percent or greater based on the weight of the the one part curable composition and the cure accelerator, more preferably about 0.05 weight percent by weight or greater and most preferably about 0.1 weight percent or greater. Preferably is present in an amount of about 0.5 weight percent or less based on the weight of the one part curable composition and the cure accelerator, more preferably about 0.4 weight percent by weight or less and most preferably about 0.3 weight percent or less.

The cure accelerator further comprises a paste forming agent which is a material that when mixed with water and the liquid carrier forms a paste, and preferably a homogeneous paste. Paste as used herein means mixtures of liquid carriers with any material that is capable of revers-ibly binding water (for example solid powdery materials) with consistency and no separation. A paste forming agent is preferably when contacted with water absorbs water and releases water when contacted with an isocyanate functional material. Exemplary paste forming agents comprise inorganic compounds that form hydrates with water, porous materials that may contain water in its pores, materials that accommodate water in nonstoichiometric amounts and have a pasty consistency or form gels. The paste forming agents may be organic or inorganic. Exemplary hydrates or aqua complexes include inorganic compounds having water bound in coordinative fashion or as water of crystallization. Examples of such hydrates are $Na_2SO_4 \cdot 10H_2O$, $CaSO_4 \cdot 2H_2O$, $CaSO_4 \cdot \frac{1}{2}H_2O$, $Na_2B_4O_7 \cdot 10H_2O$, $MgSO_4 \cdot 7H_2O$. Exemplary paste forming materials include porous materials which enclose water in cavities; for example silicates and zeolites. Particularly suitable are kieselguhr and molecular sieves. The size of the cavities is to be chosen such that they are optimum for the accommodation of water. Consequently molecular sieves with a pore size of 4 Å are found particularly suitable. Exemplary paste forming materials which ac-commodate water in nonstoichiometric amounts and have a pasty consistency or form gels include silica gels, clays, such as montmorillonite, bentonites, hectorite or polysaccharides, such as cellulose, cellulose ethers (methyl cellulose), starch, or polyacrylic acids. Also suitable are materials which carry ionic groups. Polyurethane polymers containing carboxyl groups or sulfon-ic acid groups as side chains and, respectively, their salts, especially their ammonium salts are useful as paste forming materials. Preferred paste forming materials comprise clays. Preferred clays useful include kaolin, surface treated kaolin, calcined kaolin, aluminum silicates and surface treated anhydrous aluminum silicates. The clays can be used in any form which facilitates formulation of a pumpable composition. Preferably, the clay is in the form of pulverized powder, spray dried beads or finely ground particles. These paste forming materials are able to accommodate and bind water until their water uptake capacity is exhausted. Two or more paste forming agents may be utilized in the compositions of the invention. In some embodiments one of the paste forming agents may be a thickening agent capable of thickening the paste. Exemplary thick-ening paste forming agents include ultrafine attapulgite, bentone, silica and the like. The paste forming agents are used in sufficient amount to form a paste and to bind water until needed for reaction with the isocyanate functional components. Preferably paste forming agent is present in an amount of about 1 weight percent or more based on the weight of the cure accelerators, more preferably about 5 weight percent by weight or greater and most preferably about 15 weight per-cent or greater. Preferably paste forming agent is present in an amount of about 50 weight percent or less based on the weight of cure accelerators, more preferably about 45 weight percent by weight or less and most preferably about 40 weight percent or less. Preferably the paste forming agent is present in an amount of about 0.2 weight percent or greater based on the weight of the one part curable composition and the cure accelerator, more preferably about 0.3 weight percent by weight or greater and most preferably about 0.4 weight percent or greater. Preferably the paste forming agent is present in an amount of about 1.5 weight percent or less based on the weight of the one part curable composition and the cure accelerator, more preferably about 1.0 weight percent by weight or less and most preferably about 0.9 weight percent or less. Where present the paste forming agent in the form of a thixotropic thickener is present in an amount of about 0.1 weight percent or greater based on the weight of the cure accelerators, more preferably about 0.5 weight percent by weight or greater and most preferably about 1.0 weight percent or greater. Preferably the paste forming agent in the form of a thickener is present in an amount of about 10 weight percent or less based on the weight of the cure accelerator, more preferably about 7 weight percent by weight or less and most preferably about 5 weight percent or less. Preferably the paste forming agent in the form of a thickener is present in an amount of about 0.01 weight percent or greater based on the weight of the one part curable composition and the cure accelerator, more preferably about 0.02 weight percent by weight or greater and most preferably about 0.04 weight percent or greater. Preferably the paste forming agent in the form of a thixotropic thickener is present in the one part curable composition and the cure accelerator in an amount of about 0.3 weight percent or less based on the weight of composition, more preferably about 0.15 weight percent by weight or less and most preferably about 0.1 weight percent or less.

The cure accelerator may contain a curing agent located in the second part. Such curing agent comprises one of more compounds that contain greater than one hydroxyl group. The curing agents can be one or more hydroxyl containing low molecular weight compounds, polymines or polyols.

Polyols as described hereinbefore can be utilized as curing agents. One class of polyols can be prepolymers as described hereinbefore prepared utilizing excess equival-ents of hydroxyl groups such that the resulting prepolymers contain hydroxyl groups. The one or more low molecular weight compounds have two or more isocyanate reactive groups and a hydrocarbon backbone wherein the backbone may further comprise one or more heteroatoms. Such low molecular weight compounds may be compounds known in the art as chain extenders, such compounds are multifunctional, or crosslinkers, which have, on average, greater than two active hydrogen groups per compound. Preferably, the molecular weight of the low molecular weight compound is about 1000 or less and more preferably about 500 or less. Preferably, the low molecular weight compound may comprise one or more multifunctional alcohols, multifunctional amines, or one or more adducts of multifunctional alcohol or multifunctional amine and an alkyl-ene oxide or a mixture thereof. Blends of various low molecular weight compounds may be used.

The one part curable composition may be formulated by blending the components together using means well known in the art. The components are blended in a suitable mixer. Such blending is preferably conducted in under vacuum or in an inert atmosphere, such as nitrogen or argon, in the absence of oxygen and atmospheric moisture to prevent premature reaction. It may be advantageous to add plasticizers to the reaction mixture for preparing the isocyanate functional components so that such mixtures may be easily mixed and handled. Alternatively, the plasticizers can be added during blending of all the components. The ingredients are blended for a sufficient time to prepare a well blended mixture, preferably from about 10 to about 60 minutes. Once the composition is formulated, it is packaged in a suitable container such that it is protected from atmospheric moisture. Contact with atmospheric moisture could result in premature crosslinking of the prepolymers containing isocyanate groups. The cure accelerator may be formulated by blending the components together using means well known in the art.

The one part curable compositions may used to bond glass to other substrates such as metal or plastics. The one part curable compositions may be contacted with the cure accelerator to speed up cure these applications, especially when exposed to low temperatures and/or humidity's. In a preferred embodiment, the first substrate is a glass or scratch resistant plastic window and the second substrate is a window frame. In another preferred embodiment, the first substrate is a window and the second substrate is a window frame of an automobile. Preferably, the window is cleaned and may have a glass wipe or primer applied to the area to which the adhesive is to be bonded. The window flange may be primed with a paint primer. The one part curable com-posi-tion, optionally mixed with the cure accelerator, is applied in a bead to the periphery of the window located such that it will contact the window flange when placed in the vehicle. The win-dow with the composition located thereon is then placed into the flange with the composition lo-cated between the window and the flange. The bead of the composition is a continuous bead that functions to seal the junction between the window and the window flange. A continuous bead of the composition is a bead that is located such that the bead connects at each end to form a continuous seal between the window and the flange when contacted. Thereafter, the composition is allowed to cure. The one part curable compositions, optionally mixed with the cure accelerator, can be used to bond replacement windows into a structure. In this embodiment, the old window or a portion thereof is removed from the window flange or frame. This is typically achieved by cut-ting the old adhesive between the glass and the flange or frame. In some circumstances, the por-tion of the old adhesive remaining on the flange or window frame is left on the frame or flange. The portion of the flange or frame that does not have old adhesive deposited thereon can be primed. The one part curable composition can be applied to the frame or flange over the old adhesive and it will bond to the old adhesive. The old adhesive may be a polyurethane, siloxane, siloxy functional polyether or siloxy functional polyolefin.

In use, the one part curable compositions are blended with the cure accelerator as would normally be done when working with a two-part compositions. Application of the one part curable composition and the cure accelerator may be acheived with conventional, commercially available dispensers including static and dynamic mixing. Such dispensers with static mixing are shown in U.S. Pat. Nos. 4,538,920 and 5,082,147 (incorporated herein by reference) and are available from Conprotec, Inc. (Salem, N.J.) under the trade name MIXPAC or SULZER™ QUADRO of Sulzer Ltd., Switzerland. The blended composition is extruded from the mixing chamber onto a substrate. When using electrically-driven equipment, dynamic mixing may be used. Alternatively the two part composition may be disposed in a single tube with the cure accelerator located in a bag within the one part curable composition. In this embodiment a single tube is used and when the two parts are extruded from the tube they are passed through a nozzle containing mixing elements so as to mix the components sufficiently such that the composition can undergo cure once mixed. The one part curable compositions and cure accelerator start to cure upon mixing the two parts. Curing can be accelerated by applying heat to the curing composition by means of infrared, induction, convection, or microwave heating, application of ultrasonic vibration and the like. The viscosities of the parts are measured by press flow viscosity. Press flow viscosity is measured by forcing 20 grams of the material through an orifice having an opening with a diameter of 0.157 inch with 60 psi pressure and recording the time (seconds) for the material to pass through the orifice. Preferably the press flow viscosity is about 5 seconds or greater and most preferably 8 seconds or greater. Preferably the press flow viscosity is about 40 seconds or less and most preferably 35 seconds or less. Preferably the parts exhibit sag of 2 mm or less measured as the fall of the tip of the horizontal bead.

In another embodiment the compositions of the invention can be used to bond modular components to a car body or to each other. Examples of modular components include vehicle modules, such as door, window or body. Molecular weights as described herein are number average molecular weights which may be determined by Gel Permeation Chromatography (also referred to as GPC). For polyurethane prepolymers, it is also possible to calculate approximate number average molecular weight from the equivalent ratio of the isocyanate compounds and of the polyol compounds with which they are reacted as known to the persons skilled in the art.

Illustrative Embodiments of the Invention

The following examples are provided to illustrate the invention, but are not intended to limit the scope thereof. All parts and percentages are by weight unless otherwise indicated.

Preparation of a Polyether Based Isocyanate Functional Prepolymer (Prepolymer 1) A polyether polyurethane prepolymer is prepared by mixing 364 g of a polyoxypropylene diol having a weight average molecular weight of 2,000 with 527 g of a polyoxypropylene triol having a weight average molecular weight of 4,500 and 32 grams of diisononyl phthalate plasticizer. Mixing is carried out in a reactor by heating the mixture to 54° C. 160.6 g of dipheylmethane-4,4'-diisocyanate and 0.08 g of stannous octoate are added to the mixture. The whole mixture is then reacted for 1 hour at 80° C. Finally, 501 grams of diisononyl phthalate plasticizer and 15 grams of diethyl malonate are added to the mixture and the mixing is continued for 1 hour.

Ingredients

Prepolymer—prepared as described above; viscosity 11,160 centipoises at 25° C., isocyanate content 1.49 percent Plasticizer diisononylphthalate.

Tertiary amine catalyst—dimorpholino diethyl ether

Tin catalyst DABCO™ DC-21

Basic Filler 1—untreated calcium carbonate having a pH of 9.7 (25 percent in Deionized water)

Basic Filler 2—talc having a pH of 9.4 (25 percent in Deionized water)

Carbon Black 1 Elftex® S7100 High Surface area carbon black; iodine absorption number 189 g/kg.

Carbon Black 2 (standard) PRINTEX® 30 carbon black, iodine adsorption number of 90 g/kg Polyether polyol—PLURACOL™ TP440 polyether polyol Paste forming 1—Agent ATTAGEL™ 50 ultrafine attapulgite thickening agent Paste forming agent 2—Aluminum Silicate.

clay and water

Test Procedures. Brookfield Viscosities for liquids and low viscous pastes as des-cribed herein are determined according to the procedure disclosed in Bhat, U.S. Pat. No. 5,922, 809 at column 12, lines 38 to 49, incorporated herein by reference. Adhesive viscosities as described herein are determined using press flow. The press flow is the time it takes for 20 grams of adhe-sive to pass through a 0.157 inch (4.0 mm) orifice under 60 psi (413 kPa) pressure. Quick knife adhesion (QKA) test is run according to the following. An adhesive bead of 6.3 mm (width)×6.3 mm (height)×100 mm (length) is placed on the tested substrate and the assembly is cured for a specific time at 23° C. and 50 percent RH (relative humidity). When tested, a slit (20-40mm) is made between the adhesive end and the substrate. The cured bead is then cut with a razor blade at a 45° angle while pulling back the end of the bead at 180° angle to the substrate. The degree of adhesion is evaluated as adhesive failure (AF) and/or cohesive failure (CF). In case of AF, the cured bead can be separated from the substrate and in case of CF, separation occurs only within the adhesive bead as a result of knife cutting. The sag test is carried out using the following procedure. A rectangular metal panel of 10 cm height and 30 cm long is standing up 90° on the bench by its length. A right angle triangle bead of the adhesive composition of 1.5 cm height and 0.7 cm base is dispensed along the top edge of the panel with the base touching the panel and the height perpendicular to the top edge of the panel.

After 30 minutes, the sag at the tip of the adhesive composition is measured and recorded (in millimeter). Cure rate is determined through lap shear testing. The lap shear test is performed according to SAE J1529 procedure which is described below. A triangle bead of adhesive composition approximately 6.3 mm base and 8 mm height is applied along the width of a first substrate of 25 mm by 100 mm, such as an electric coated metal coupon or a glass coupon primed with Betaseal™ 43518 and Betaseal™ 43520A, and about 6 mm away from the coupon end. The second electric coated substrate, which can be either primed or not, is immediately pressed on the adhesive bead to give a final height of 6 mm for the composition in between. The sample is allowed to cure under specific conditions (e.g. 10° C. and 30 percent relative humidity or other) for specified time (e.g. 2 hours or other). The sample is then pulled right away at a rate of 5 inch/minute (127 mm/min) with an Instron Tester. The load (lbs) at sample break divided by the sample area (in$^2$) gives the lap shear adhesion strength (psi). Cohesive failure refers to the separation within the adhesive bead.

Part I Preparation. Part I mixture is prepared from the ingredients listed in Table 1. Prepolymer, plasticizer, Dimorpholino diethyl ether, and tin catalyst are charged into a 2 gallon mixer according to the stated amounts. The mixture is degassed under vacuum and mixed for 15 minutes. The vacuum is broken and both carbon black and other fillers, previously oven dried and cooled to room temperature, are added into the mixer. Vacuum is applied slowly, when half of the vacuum is achieved, mixing is started to wet out the fillers for 2 minutes. The vacuum valve is then fully opened and mixing is continued under full vacuum for 15 minutes. Vacuum is broken again and the mixture is scraped down. The full vacuum is re-applied again and the mixture is mixed under vacuum for another 5 minutes. The vacuum is removed with nitrogen and the part I component is packaged into sealed tubes and stored in aluminum bags. Each sample is made at 1600 grams scale.

Part II Preparation. Using the HAUSCHILD mixer, charge all ingredients into the mixer cup except water and mix for 2 minutes at 2100 rpm, stop mixing and scrape down. Add water and mix for another 2 minutes at 2100 rpm. Stored for later use, each sample is 150 grams.

Mixing of Part I and Part II. Using the HAUSCHILD mixer, charge 75 grams of Part I, 3 grams of Part II and another 75 grams of Part I into a mixer cup, mixed at 2000 rpm for 50 seconds. The composition is scraped down and then mixed for another 50 seconds at 2000 rpm.

TABLE 1

| Ingredient wt % | Comparative Example 1 | Example 1 | Com 2 | Com 3 | Exp 2 | Exp 3 | Exp 4 | Exp 5 |
|---|---|---|---|---|---|---|---|---|
| Part I | | | | | | | | |
| Prepolymer | 66.6 | 67.6 | 70.7 | 66.7 | 70.7 | 66.7 | 54.7 | 70.7 |
| Plasticizer | 0 | 0 | 0 | 0 | 0 | 0 | 6.0 | 0 |
| Dimorpholino diethyl ether | 0.28 | 0.28 | 0.18 | 0.18 | 0.18 | 0.18 | 0.21 | 0.18 |
| Tin Catalyst | 0.14 | 0.14 | 0.14 | 0.14 | 0.14 | 0.14 | 0.14 | 0.14 |
| Calcium Carbonate | 9.0 | 9.0 | 0 | 0 | 12 | 16 | 22.0 | 0 |
| Carbon Black 1 | 0 | 23.0 | 17 | 17 | 17 | 17 | 17.0 | 17.0 |

TABLE 1-continued

| Ingredient wt % | Comparative Example 1 | Example 1 | Com 2 | Com 3 | Exp 2 | Exp 3 | Exp 4 | Exp 5 |
|---|---|---|---|---|---|---|---|---|
| Carbon Black 2 | 24 | 0 | 0 | 0 | 0 | 0 | 0 | 0 |
| Clay | 0 | 0 | 12 | 16 | 0 | 0 | 0 | 0 |
| Talc | | | | | | | | 12 |
| Part II | | | | | | | | |
| Liquid carrier | 58.5 | 58.5 | 58.5 | 58.5 | 58.5 | 58.5 | 58.5 | 58.5 |
| Paste forming agent 1 | 2.72 | 2.72 | 2.72 | 2.72 | 2.72 | 2.72 | 2.72 | 2.72 |
| Paste forming agent 2 | 31.8 | 31.8 | 31.8 | 31.8 | 31.8 | 31.8 | 31.8 | 31.8 |
| Water | 6.9 | 6.9 | 6.9 | 6.9 | 6.9 | 6.9 | 6.9 | 6.9 |

Figure 2:
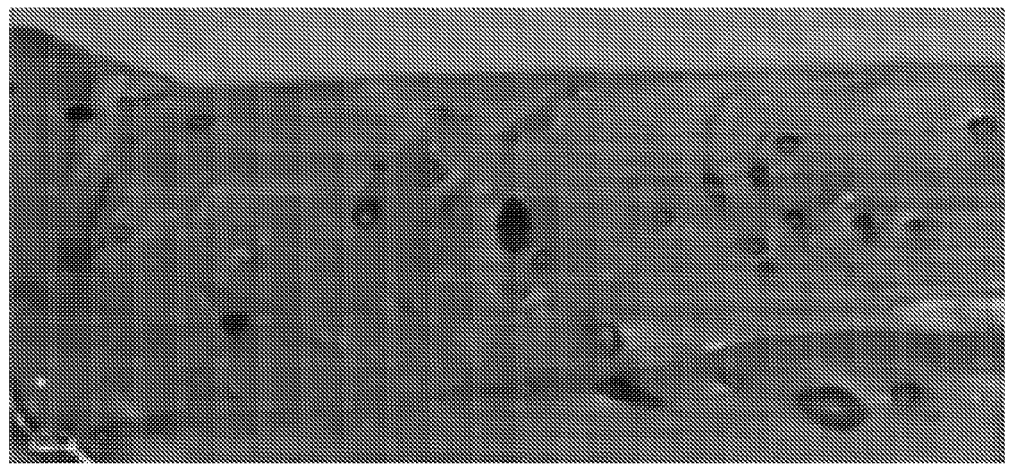
FIG. 2 is a picture of a cut through a cured composition not meeting the requirements of the claimed invention for comparison purposes.

Comparative Example 1 and Example 1 are mixed as disclosed and each is then used to fill a tin weighing cup of a diameter of 5.5 cm and depth of 1.5 cm. The material in the cup is allowed to cure for 7 days at 23° C. and 50 percent relative humidity (RH). The cured material is cut open for gas pocket inspection. Upon inspection of the cured material of Example 1 it is noted that there were none of a few gas pockets in a cut cross-section (5.5 cm by 1.5 cm). FIG. 1 shows an example of such a sample. The inspection of samples from comparative Example 1 shows numerous gas pockets (30 to 50 gas pockets) in the cut cross-section. FIG. 2 is an illustrated sample of Comparative Example 1.

Comparative Examples 2 and 3 and Examples 2 to 5 are tested for gas pockets as described hereinbefore. All of the samples show no or few gas pockets (0-2). Cure rate testing of Comparative Examples 2 and 3 and Examples 2 to 5 are performed by mixing the Part I for each with Part II as described hereinbefore. Lap shear samples are prepared and cured at 10° C. and 30 percent relative humidity. The lap shear samples are tested at 2, 4 and 24 hours from application. The results are compiled in Table 2.

TABLE 2

| Lapshear Strength (psi)/ Time (hrs) | Comp 2 | Comp 3 | Ex 2 | Ex 3 | Ex 4 | Ex 5 |
|---|---|---|---|---|---|---|
| 2 | 4.6 | 3.7 | 18.3 | 14 | 99.1 | 17.8 |
| 4 | 41 | 41.2 | 192.8 | 224.6 | 364.2 | 224.1 |
| 24 | | | | | 464.2 | 444.3 |

Quick knife adhesion samples are prepared using the mixture of Example 4. The substrates are steel coupons painted with a carbamate based topcoat without a primer and glass coupons primed with Betaprime™ 5500 primer. These samples are cured at 23° C. and 50 percent relative humidity for 3 days. These samples then are divided into 2 sets and each set has one primed glass coupon plus one painted metal coupon. The first set of samples, one painted metal coupon and one primed glass coupon, are tested and demonstrates 100 percent cohesive failure in each case. The second set of samples is further exposed to 38° C. at 100 percent relative humidity for 14 days. These samples showed 100 percent cohesive failure in the Quick knife adhesion test.

The part I of the formulations is measured for press flow viscosity from 60 psi pressure and 0.157 inches orifice. The results are compiled in Table 3. The results show these samples have low viscosities and are easily extrudable.

TABLE 3

| Example | Comp 2 | Comp 3 | Ex 2 | Ex 3 | Ex 4 | Ex 5 |
|---|---|---|---|---|---|---|
| Press Flow Viscosity, seconds/20 gram | 13 | 19 | 10 | 12 | 12 | 12 |

Any numerical values recited in the above application include all values from the lower value to the upper value in increments of one unit provided that there is a separation of at least 2 units between any lower value and any higher value. As an example, if it is stated that the amount of a component or a value of a process variable is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

The invention claimed is:

1. A composition comprising:
   I) a one part curable composition comprising
      a) one or more isocyanate functional components;
      b) one or more catalysts for the reaction of isocyanate groups with active hydrogen containing groups;
      c) one or more fillers which comprise a high surface area carbon black having an Iodine adsorption number of about 100 g/kg or greater wherein high surface area is determined by the ASTM D1510 method;
      d) one or more fillers having basic character; end
   II) a cure accelerator comprising
      e) one or more liquid carriers;
      f) water; and
      g) one or more paste forming agents comprising a material that is capable of reversibly binding water with consistency and no separation.

2. A composition according to claim 1 wherein one or more isocyanate functional components comprise one or more isocyanate functional prepolymers.

3. A composition according to claim 1 wherein the paste forming agent comprises one or more materials that form a homogeneous paste with water and the liquid carrier.

4. A composition according to claim 1 wherein the liquid carrier is glycol ether or a polyether polyol.

5. A composition according to claim 1 wherein the equivalent ratio of hydroxyl groups contained in the cure accelerator to isocyanate groups in the one part curable composition is from about 0.7:1 to 1.3:1.

6. A composition according to claim 1 wherein the one or more fillers having basic character exhibit a pH of 9.0 or greater when dissolved or dispersed in deionized water.

7. A composition according to claim 1 wherein the volumetric ratio of the one part curable composition to cure accelerator is 100:1 to 25:1.

8. A composition according to claim 1 wherein the one or more fillers having basic character comprise one cr more of talc or calcium carbonate.

9. A composition according to claim 1 wherein the paste forming agent is one or more clays.

10. The composition according to claim 1 wherein the one part curable composition and the cure accelerator each have a viscosity at 25° C. such that the ratio of the viscosity of the one part curable composition to the cure accelerator is from about 0.1 to 10.0.

11. A method comprising:
   i) contacting the one part curable composition and the cure accelerator according to claim 1 together;
   ii) contacting the contacted composition of i) with a first substrate;
   iii) contacting the first substrate with a second substrate with the contacted composition of i) disposed between the two substrates; and,
   iv) allowing the composition of i) to cure and bond the two substrates together.

12. A method according to claim 11 herein the tic components are mixed before contacting with the first substrate.

13. A method according to claim 11 wherein the first substrate is glass or transparent plastic wherein the glass or transparent plastic may have an organic or ceramic enamel frit located about the periphery of the glass or transparent plastic.

14. A method according to claim 11 wherein the second substrate is plastic or metal which may be coated.

15. A method comprising:
   i) contacting the one part curable composition according to claim 1 and the cure accelerator wherein the one part curable composition and the cure accelerator each have a viscosity at 25° C. such that the ratio of the viscosity of the one part curable composition to the cure accelerator is from about 0.1 to 10.0 and the volumetric ratio of the one part curable composition and the cure accelerator is about 25:1 to greater;
   ii) contacting the mixture with a first substrate; and
   iii) contacting the first substrate with a second substrate so that the mixed components are disposed therebetween on at least a portion of each of the substrates.

* * * * *